United States Patent [19]

Inoue

[11] Patent Number: 4,847,711
[45] Date of Patent: Jul. 11, 1989

[54] CHARGE GROUNDING HINGE MECHANISM

[75] Inventor: Osamu Inoue, Kyoto, Japan

[73] Assignee: Mitsubishi Denki Kabushiki Kaisha, Tokyo, Japan

[21] Appl. No.: 63,349

[22] Filed: Jun. 18, 1987

[30] Foreign Application Priority Data

Jun. 20, 1986 [JP] Japan .................................. 61-145794
Jun. 20, 1986 [JP] Japan .................................. 61-145793

[51] Int. Cl.⁴ .......................... G11B 5/008; G11B 3/58
[52] U.S. Cl. ................................... 360/96.5; 360/137; 369/72
[58] Field of Search ................. 360/96.6, 137, 96.5, 360/97.01, 97.02; 361/212; 369/72, 73

[56] References Cited

U.S. PATENT DOCUMENTS

| | | | |
|---|---|---|---|
| 2,744,212 | 5/1956 | Baum | 369/72 X |
| 4,357,697 | 11/1982 | Yi | 369/72 |
| 4,570,197 | 2/1986 | Hakanson et al. | 360/133 X |
| 4,607,301 | 8/1986 | Iizuka | 360/137 X |

FOREIGN PATENT DOCUMENTS

| | | | |
|---|---|---|---|
| 0214466 | 10/1985 | Japan | 369/72 |
| 0214467 | 10/1985 | Japan | 369/72 |
| 7712085 | 10/1979 | Sweden | 369/72 |

Primary Examiner—Robert S. Tupper
Assistant Examiner—Andrew L. Sniezek
Attorney, Agent, or Firm—Sughrue, Mion, Zinn, Macpeak and Seas

[57] ABSTRACT

Electrostatic charge on a cassette or disc is grounded, when the latter is inserted into a player therefor through an opening formed in a front panel thereof, through a grounding path connecting a hinge pin of a flap covering the opening normally by a biasing spring associated therewith to a chassis of the player.

3 Claims, 3 Drawing Sheets

CHARGE GROUNDING HINGE MECHANISM

BACKGROUND OF THE INVENTION

The present invention relates to a grounding mechanism for electrostatic charge of a cassette player, etc. which is capable of preventing electrostatic charge on a user of the player from entering into an electric circuitry of the player.

FIGS. 1 and 2 show an example of a conventional mechanism of this type, in which reference numeral 1 depicts a panel mounted on a front end of a chassis 2 and an opening 3 is formed in a center front surface of the panel 1 through which a cassette A is inserted into or pulled out from the chassis 2. A flap 4 is provided in an inside of the opening 3. The flap 4 is hinged at an upper edge thereof by a support pin 5 and biased by a spring 6 so that the flap is normally held in a position in which the opening 3 is closed thereby, as shown in FIG. 1. A grounding plate 7 is provided along an inner lower surface of the panel 1 and has a top end in contact with a lower edge of the opening 3 and in contact with a lower edge of the flap 4 when it is in the closed position, A printed circuit board 8 mounting electronic components thereon and a cassette holder 9 are also provided in the chassis 1.

With such construction, when the cassette A is inserted into the opening 3 by pushing the flap 4 with a front end of the cassette A against the resiliency of the spring 6, electrostatic charge on the cassette A is grounded through the contact between the flap 4 and the grounding plate 7 instantaneously to thereby protect the electronic components on the printed circuit board 8 from electrostatic breakdown.

In such conventional system, however, the provision of the grounding plate 7 in contact with the inner surface of the panel 1 makes an overall structure of the cassette player complicated, resulting in an increased manufacturing cost.

Further, since electrostatic charge on the tape cassette is grounded during a very short time before a movement of the flap 4 to an open position is initiated by the contact thereof with the front end of the cassette, the charge on the cassette is not always grounded completely.

SUMMARY OF THE INVENTION

An object of the present invention is to provide a simplified grounding mechanism for reliably grounding electrostatic charge on a tape cassette when it is inserted into a cassette player through a cassette insertion opening thereof.

The grounding mechanism according to the present invention includes a flap hinged at an upper edge thereof with an upper edge of the cassette insertion opening of the player by a hinge pin and biased by a spring so that it covers the opening normally, and a conductive member for connecting the hinge pin to a grounding portion of a chassis of the cassette player. Therefore, electrostatic charge on the cassette is effectively grounded through the hinge pin and the conductive member to the grounding portion of the chassis. Thus, electronic components arranged within the chassis are protected effectively from electrostatic charge.

DETAILED DESCRIPTION OF THE PREFERRED EMBODIMENTS

Figure 1:
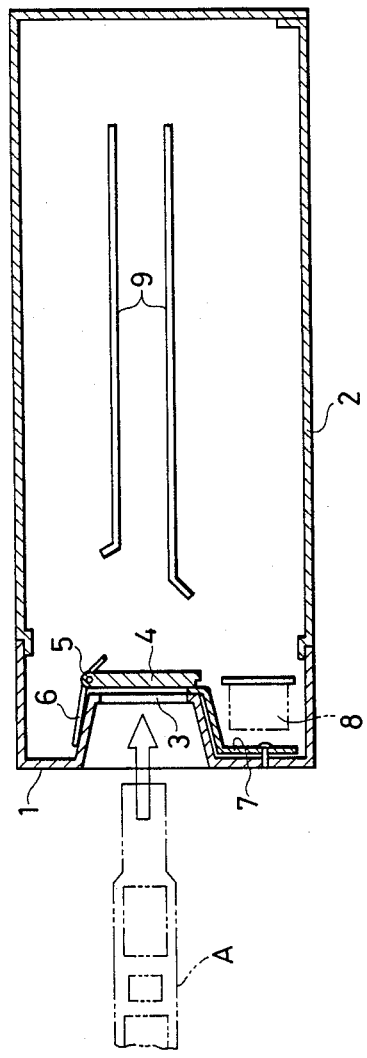
FIG. 1 is a schematic cross section of a conventional charge grounding mechanism.
Figure 2:
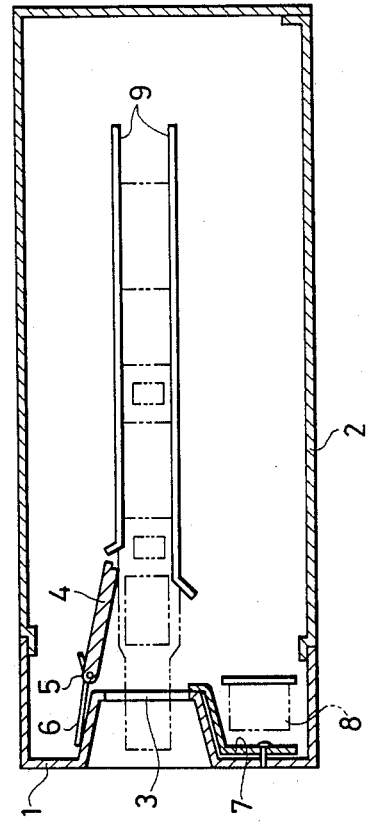
FIG. 2 shows the conventional mechanism in FIG. 1 when a tape cassette is inserted thereinto.
Figure 3:
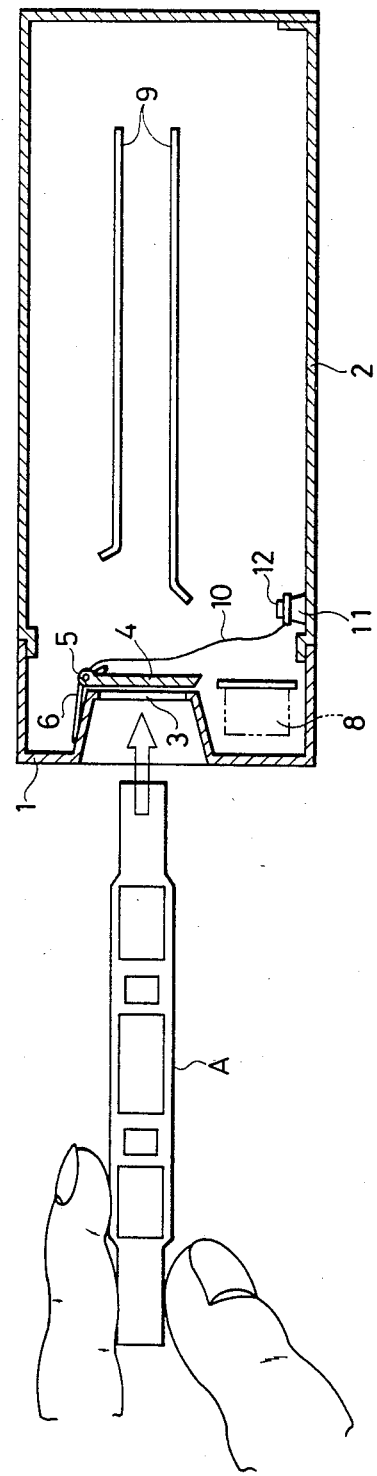
FIG. 3 is a schematic cross section of an embodiment of the present invention.
Figure 4:
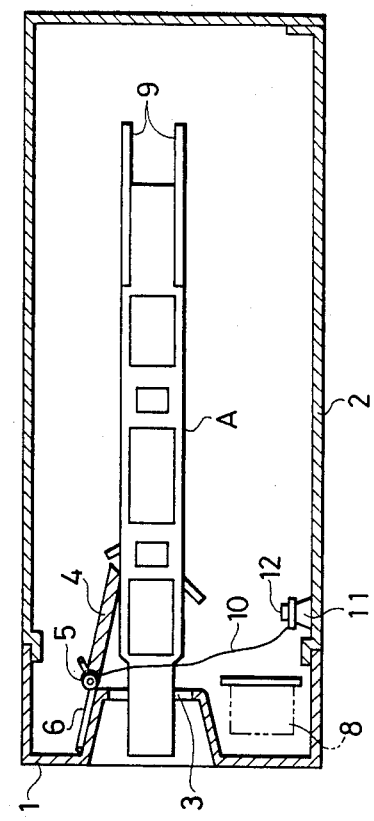
FIG. 4 shows the embodiment in FIG. 3 when a tape cassette is inserted thereinto.

In FIGS. 3 and 4 which show a first embodiment of the present invention, components depicted by reference numerals 1 to 6, 8 and 9 are the same as those shown in FIGS. 1 and 2, respectively. Instead of the grounding plate 7 in FIGS. 1 and 2, a grounding lead wire 10 is provided to connect the hinge pin 5 of the flap 4 to a grounding portion 11 provided on the bottom of the chassis 2. In this construction, the hinge pin 5 may be of a material suitable to solder the grounding lead wire 10 thereto or may be coated with such material. The lead wire 10, on the other hand, is fixedly secured to the grounding portion 11 by a suitable screw 12. A wiring path for the lead wire 10 should be selected so that it does not become an obstacle for the movement of the cassette A with respect to the cassette player.

When the cassette A is pushed into the cassette insertion opening 3 against the biasing force exerted on the flap 4 by the spring 6, electrostatic charge given by an operator's body onto the cassette A is discharged firstly through the flap 4 to the hinge pin 5, which is closer to the operator's body than a printed circuit board 8 on which the electronic elements are mounted, and then through the lead wire 10 to the chassis 2. Thus, the electronic components on the printed circuit board 8 can be protected against electrostatic destruction.

In the first embodiment mentioned above, the hinge pin 5 of the flap 4 is connected to the chassis 2 by the lead wire 10. In a second embodiment of the present invention, which is shown in FIGS. 5 and 6, such grounding path is formed by a portion of the flap biasing mechanism.

Figure 5:
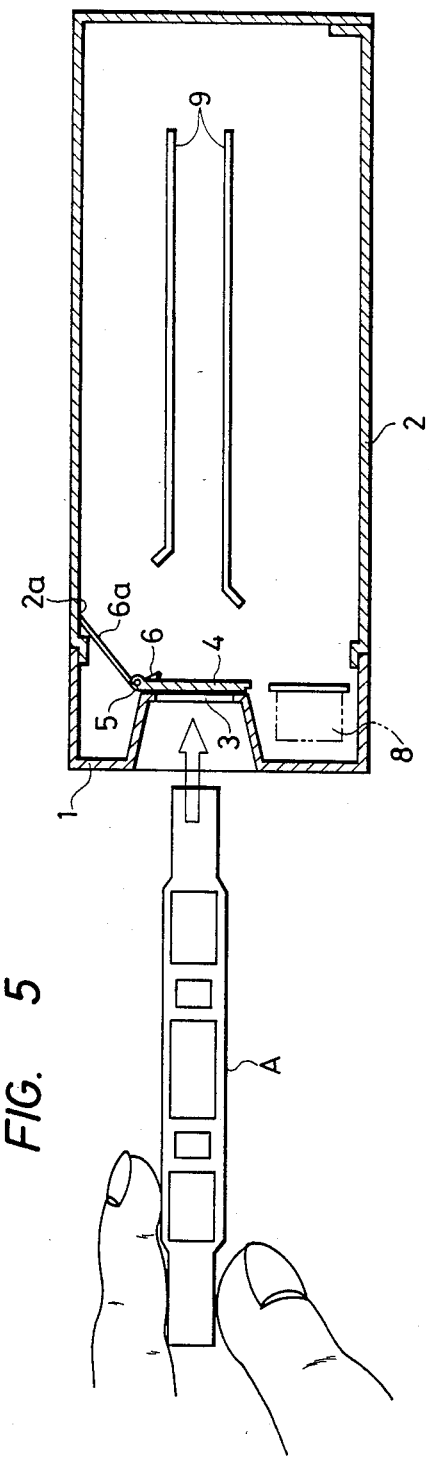
FIG. 5 is a schematic cross section of another embodiment of the present invention.
Figure 6:
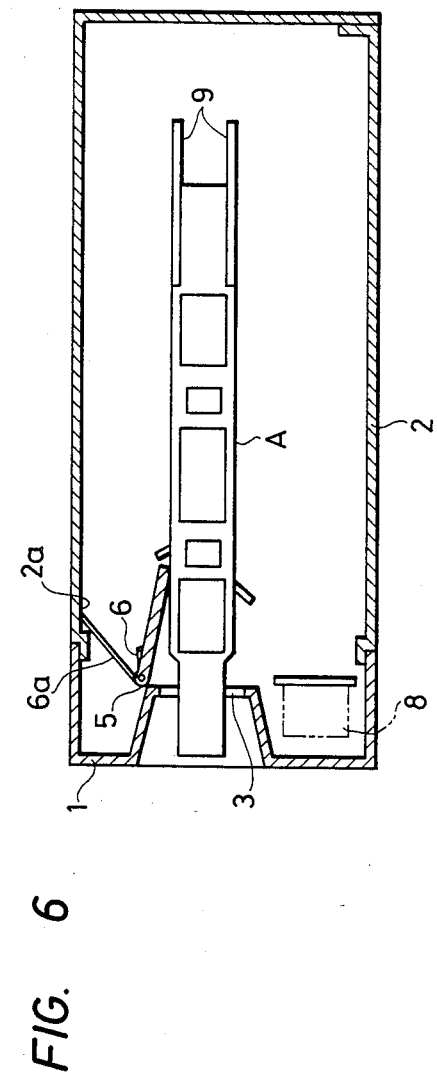
FIG. 6 shows the embodiment in FIG. 5 when a tape cassette is inserted thereinto.

In FIGS. 5 and 6, one end of the spring 6 is extended and fixedly held by an inner surface 2a of the chassis 2, through which a grounding path 6a is formed.

In such construction, when the cassette A is pushed into the cassette insertion opening 3, electrostatic charge on the cassette A is discharged firstly through the flap 4 to the hinge pin 5 thereof, and then through the grounding path 6a formed by the portion of the biasing spring 6 to the chassis 2. Thus, it is necessary to form the spring 6 of an electrically conductive material or to plate it with a suitable electrically conductive material when the spring 6 is of a non-conductive material such as synthetic resin. Since the contact pressure between the extension 6a and the chassis 2 is increased when the flap 4 is opened by the cassette, the grounding effect of this embodiment is much improved.

Although the present invention was described with reference to a cassette tape deck, it should be noted that this invention can be applied to other devices such as a video deck, a compact disc player, etc. with the same effects. Further, when the flap 4 is made of metal, the charge grounding effect is enhanced.

As described hereinbefore, according to the present invention, electrostatic charge on the cassette is grounded through the hinge of the flap and a conductive member connecting the hinge pin to the chassis. Therefore, provision of the grounding path becomes simplified, resulting in considerable reduction of manufacturing cost.

What is claimed is:

1. A grounding mechanism for grounding electrostatic charge on a record medium such as a tape cassette or disc when said medium is inserted into a reproducing device such as cassette player or compact disc player, comprising: a reproducing device chassis (2), an elongate insertion opening (3) formed in a front panel of said chassis, an elongate, electrically conductive closure flap (4) disposed inwardly of and overlying said opening, an electrically conductive hinge pin (5) mounting said closure flap to a longitudinal edge of said opening for pivotal movement between a first position whereat said insertion opening is closed by said flap, and a second, open position pursuant to the insertion of said record medium, and a biasing spring (6) for biasing said flap to said first position, wherein:
   (a) said grounding mechanism comprises means defining an electrically conductive path extending from said closure flap through said hinge pin to a ground potential established by said chassis,
   (b) said second, open position of the closure flap is exclusively inwardly directed,
   (c) said record medium is a tape cassette, and
   (d) a longitudinal edge of said closure flap opposite the hinge pin remains in engagement with the cassette after the insertion thereof to maintain said conductive path to ground.

2. The grounding mechanism as claimed in claim 1, wherein said conductive path is a lead wire (10) connecting said hinge pin to said chassis.

3. The grounding mechanism as claimed in claim 1, wherein said conductive path is an extension of one end (6a) of said spring, said extension being held in contact (2a) with said chassis.

* * * * *